US006614800B1

United States Patent
Genty et al.

(10) Patent No.: US 6,614,800 B1
(45) Date of Patent: Sep. 2, 2003

(54) METHOD AND SYSTEM FOR VIRTUAL PRIVATE NETWORK ADMINISTRATION CHANNELS

(75) Inventors: Denise Marie Genty, Austin, TX (US); Shawn Patrick Mullen, Buda, TX (US); Ramachandran Unniksrishnan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,443

(22) Filed: Sep. 2, 1999

(51) Int. Cl.[7] .............................................. H04J 15/00
(52) U.S. Cl. ...................... 370/464; 709/250; 713/150; 370/475
(58) Field of Search ................................ 709/200, 249, 709/250; 713/150, 151, 153, 160, 162, 201; 370/351, 352, 395.1, 395.5, 395.52, 409, 464, 475

(56) References Cited

U.S. PATENT DOCUMENTS

| | | | |
|---|---|---|---|
| 5,321,688 A | | 6/1994 | Nakano et al. ............... 370/14 |
| 5,473,771 A | | 12/1995 | Burd et al. ............ 395/182.02 |
| 5,557,611 A | | 9/1996 | Cappellari et al. ......... 370/60.1 |
| 5,583,860 A | | 12/1996 | Iwakawa et al. ............ 370/232 |
| 5,809,025 A | | 9/1998 | Timbs ........................ 370/400 |
| 6,289,388 B1 | * | 9/2001 | Disney et al. .............. 370/401 |
| 2001/0056503 A1 | * | 12/2001 | Hibbard ...................... 709/250 |
| 2003/0005331 A1 | * | 1/2003 | Williams .................... 713/201 |

OTHER PUBLICATIONS

"ATM PCI 155 Mbps NICs User Guide". 3COM ATMLink. Published Jul. 1998. pp. 1–24 and 39–45 with emphasis on p. 44.*

Kato et al. "BVPN (Broadband Virtual Private Netwok): A Flexible, High–Speed, Enterprise Network Architecture)". Distributed Computing Systems, 1995. IEEE. Aug., 1995. pp. 28–30.*

"SuperStack II Switch 2000 TR ATM OC–3 Module". 3COM CorpoRation. Published Apr., 1997.*

"155–Mbps ATM NIC Features". Network Computing. Aug. 1, 1997.*

"ForeRunnerHE 155 and 622 ATM Network Interface Cards (NICs)". Marconi Communications. Copyright 2000.*

* cited by examiner

*Primary Examiner*—Melvin Marcelo
*Assistant Examiner*—Derrick W. Ferris
(74) *Attorney, Agent, or Firm*—Duke W. Yee; Volel Emile; Lisa L. B. Yociss (57) ABSTRACT

A method and system for dual channel network connections where one channel can be used for normal data transmission and the second channel can be used for administration tasks such as correcting error on the data channel or running diagnostics. A first data processing system and a second data processing system communicate on a physical network by transmitting data packets on the network using a virtual private network (VPN). Data packets are transmitted through a first VPN channel. Administrative packets are transmitted through a second VPN channel independently of the first VPN channel. The data packets may be transmitted using Internet Protocol (IP), and a portion of the network may include the Internet. The data VPN channel and the administrative VPN channel share a single network interface card, hence only a single network interface card (NIC) is required for each data processing system.

23 Claims, 7 Drawing Sheets

```
# ! /bin/ksh
###################################################################
# This script illustrates the setting up of a VPN Admin channel.
# This script is written for a server running AIX. Both the local
# and remote servers are assumed to have only one ethernet interface card.
# This script is AIX/Unix specific but can be ported to other OS by replacing
# OS specific commands (i.e., ikegui).
############################################################# export LOCAL_DATA="8.8.8.100"      # Local Data VPN address
export REMOTE_DATA="9.9.9.100"     # Remote Data VPN address          ⎬ 700
export LOCAL_ADMIN="8.8.8.8"       # Local Admin VPN address
export REMOTE_ADMIN="9.9.9.9"      # Remote Admin VPN address

###################################################################
# The DefineChannels function defines a Phase 1 and two Phase 2 channels. The
# Phase 1 channel is used by the Phase 2 channels to negotiate Keys.
# Actual data goes through the Phase 2 channel. The "DATA" Phase 2 channel is
# the DATA VPN while the "ADMIN" Phase 2 channel is the ADMIN VPN.

# The parameters after the 'ikegui' command are positional parameters.
############################################################# function DefineChannels {
  ikegui 1 1 2 0 PHASE1 1 $LOCAL_DATA 1 $REMOTE_DATA $P1POL $KEY 0
  ikegui 1 2 2 0 DATA 1 1 $LOCAL_DATA 0 0 1 $REMOTE_DATA 0 0 P2POL1 0        ⎬ 702
  ikegui 1 2 2 0 ADMIN 1 1 $LOCAL_ADMIN 0 0 1 $REMOTE_ADMIN 0 0 P2POL1
0
}

###################################################################
# Use ifconfig command to add an alias to the local ethernet interface, en0
############################################################# ifconfig en0 alias $LOCAL_ADMIN netmask 255.255.255.0                        ⎬ 704

#############################################################
# Use rsh and ifconfig to add an alias address to the remote machine's
# ethernet interface
############################################################# rsh $REMOTE_DATA ifconfig en0 alias $REMOTE_ADMIN netmask 255.255.255.0      ⎬ 706
```

*FIG. 7A*

```
###########################################################################
# Restrict IP address displaying commands to root only
##################################################################### chmod 0500 /usr/sbin/netstat
chmod 0500 /usr/sbin/ifconfig
chmod 0500 /usr/sbin/ike
chmod 0500 /usr/sbin/ikegui rsh $REMOTE_DATA chmod 0500 /usr/sbin/netstat
rsh $REMOTE_DATA chmod 0500 /usr/sbin/ifconfig
rsh $REMOTE_DATA chmod 0500 /usr/sbin/ike
rsh $REMOTE_DATA chmod 0500 /usr/sbin/ikegui
```
⎬ 708

```
###########################################################################
# Create 2 VPNs, using IpSec (OS Specific, Sample shows AIX commands)
###########################################################################

DefineChannels              # Create Data and Admin Channels
```
⎬ 710

```
###########################################################################
# Activate the DATA & ADMIN VPNs, using OS specific commands
##################################################################### ike cmd=activate            # Activate the channels
```
⎬ 712

FIG. 7B

METHOD AND SYSTEM FOR VIRTUAL PRIVATE NETWORK ADMINISTRATION CHANNELS

CROSS-REFERENCE TO RELATED APPLICATIONS

The present invention is related to the following applications entitled "METHOD AND SYSTEM FOR ALGORITHM-BASED ADDRESS-EVADING NETWORK SNOOP AVOIDER", U.S. application Ser. No. 09/383,740; "INTERNET SNOOP AVOIDER", U.S. application Ser. No. 09/428,400, U.S. Pat. No. 6,473,863, now entitled "AUTOMATIC VIRTUAL PRIVATE NETWORK INTERNET SNOOP AVOIDER"; and "PRE-NEGOTIATED EVASION PATH INTERNET SNOOP AVOIDER", U.S. application Ser. No. 09/428,401, now entitled "MANUAL VIRTUAL PRIVATE NETWORK INTERNET SNOOP AVOIDER".

BACKGROUND OF THE INVENTION

1. Technical Field

The present invention relates to an improved data processing system and, in particular, to a method and system for reliable communication on a computer network.

2. Description of Related Art

As electronic commerce becomes more prevalent, business relationships between vendors and between a vendor and its customers become more valuable. Businesses are more willing to protect those relationships by spending more money on information technology that protects the integrity and reliability of their electronic commerce connections. In so doing, businesses protect not only their data and cash flow but also intangibles, such as reputations and good will. In addition, the complexity of information technology, the pressure of global competition, and the demands of universal access around-the-clock availability of electronic systems greatly increases the need to minimize disruptions in electronic commerce operations. The growing complexity of distributed data processing systems faces increasing reliability demands. Corporations are using new methods of communicating to meet expanding and disparate needs. Traveling employees require access to company databases. Some companies employ extranets, and other companies may require constant communication paths with strategic partners. All of these factors contribute to a corporation's growing reliance and vulnerability to complex communication infrastructures.

A corporation's information technology infrastructure may fail at various pressure points, such as telecommunication links, servers, networks, etc. Although hardware reliability may be a major concern, cost may also be a concern, and corporations have attempted to contain costs by using the open, distributed infrastructure of the Internet to transmit data between corporate sites. Dedicated leased lines may be prohibitively expensive for some companies, and other companies may require more flexibility than is provided by owning a complete communication channel. However, this openness also introduces another major concern to corporations: vulnerability. Corporations must protect against both physical vulnerability, such as hardware failures, and logical vulnerability, such as network failures.

Virtual private networks (VPNs) using the Internet enterprise-wide, communication-related problems. VPNs allow corporate administrators to connect remote branch offices to a main corporate network economically and relatively securely. Rather than depend on dedicated leased lines, an Internet-based VPN uses the open infrastructure of the Internet.

Computer systems within one business site are typically connected using a Local Area Network (LAN) and a Network Administrator is responsible for keeping the network up and running properly. To the user, a VPN has the same appearance as a LAN and requires a network administration just like a LAN. However network administration is much more difficult in a VPN because some machines are local and other machines are remote, perhaps even thousands of miles away. Many remote sites may be in small offices or may be mobile; in both cases, no network administrator is present at the remote site to solve problems.

In the past, problems have been handled by installing a second network card in every machine on the VPN. One of the cards in each machine is used to set up the data channels for the users and the second card provides a communications channel for the network administrator. Even if there is a problem on the data channels, the network administrator can access the machine on the administrative channel and work on solving the problem. This redundancy solution is usually successful since a vast majority of networking problems are due to software issues and not due to hardware failures. This solution has one major disadvantage: the need for a second network card. This is not only expensive but it uses up a card slot in the machine that may be needed for some other purpose.

Therefore, it would be advantageous to have a method and a system for more reliable network communication, and in particular, to provide a reliable network link using secure VPN channels.

SUMMARY OF THE INVENTION

A method and system for dual channel network connections where one channel can be used for normal data transmission and the second channel can be used for administration tasks such as correcting error on the data channel or running diagnostics. A first data processing system and a second data processing system communicate on a physical network by transmitting data packets on the network using a virtual private network (VPN). Data packets are transmitted through a first VPN channel. Administrative packets are transmitted through a second VPN channel independently of the first VPN channel. The data packets may be transmitted using Internet Protocol (IP), and a portion of the network may include the Internet. The data VPN channel and the administrative VPN channel share a single network interface card, hence only a single network interface card (NIC) is required for each data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7B give a specific implementation of the setup process for two machines, one local and one remote, in the form of a korn-shell script.

DETAILED DESCRIPTION OF THE PREFERRED EMBODIMENT

Figure 1:
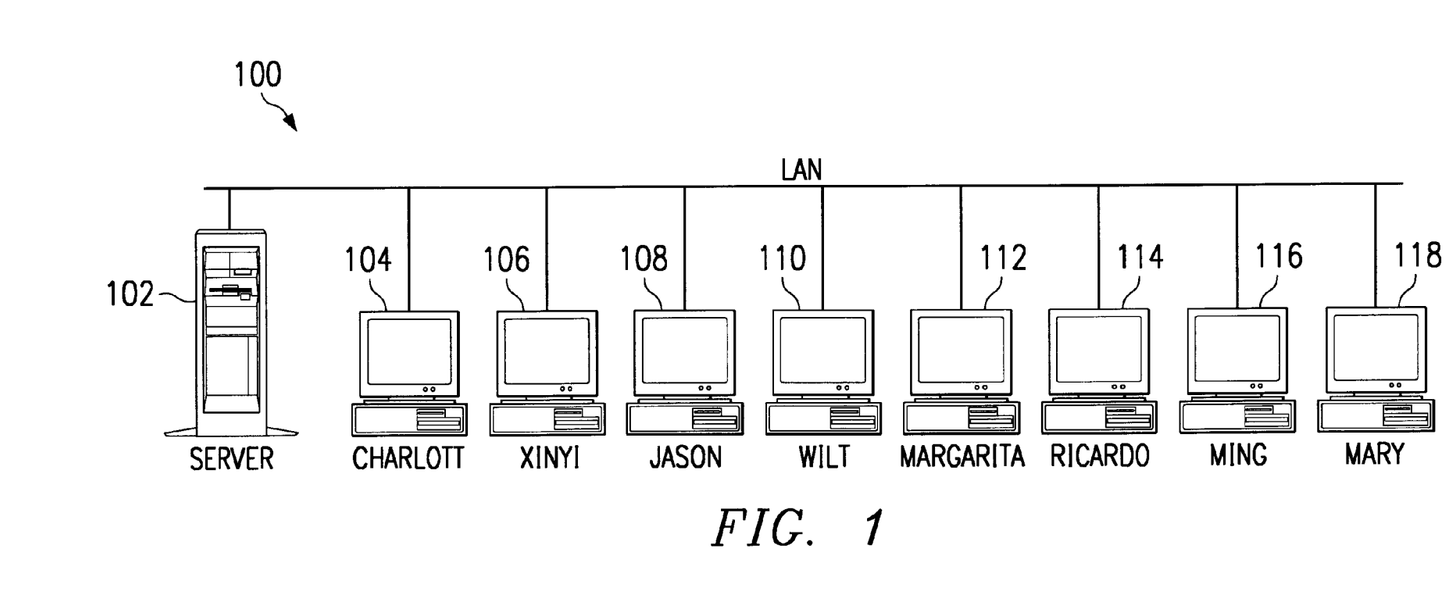
FIG. 1 is a pictorial representation of the user perspective of a Virtual Private Network (VPN) in which the present invention may be implemented.

With reference now to the figures, and in particular with reference to FIG. 1, a pictorial representation of a user's view of a VPN is depicted in which the present invention may be implemented. To the user, the network appears to function like LAN 100 that has server 102 and several users: 104, 106, 108, 110, 112, 114, 116, and 118.

Figure 2:
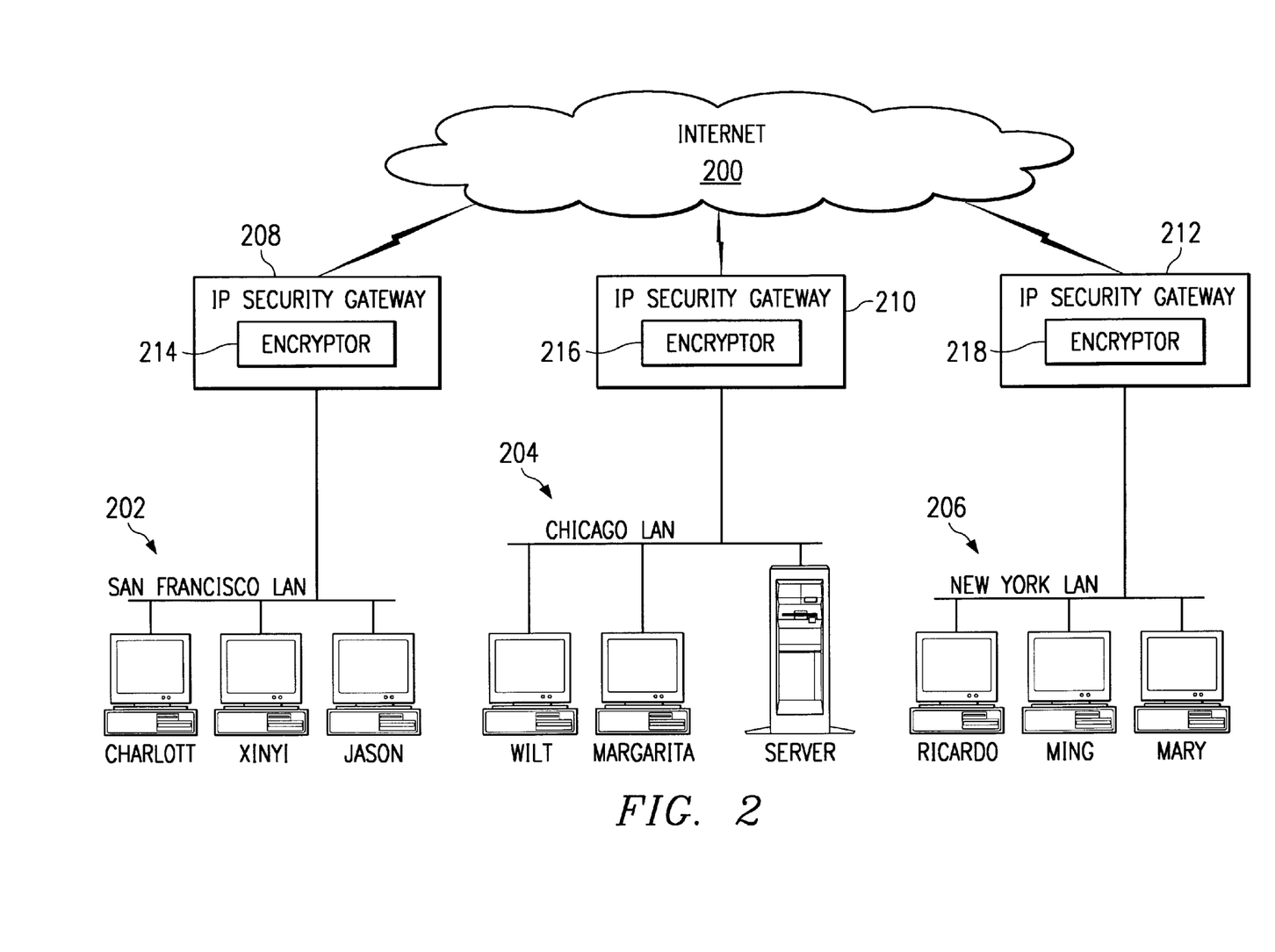
FIG. 2 depicts a physical organization of a VPN that may be configured with a mixture of equipment at several remote sites.

With reference now to FIG. 2, a diagram depicts a physical organization of a VPN. Internet 200 connects three LANs in San Francisco 202, Chicago 204, and New York 206. The LANs are connected to the Internet through IP Security Gateways 208, 210, and 212, respectively. An IP Security Gateway insures that unauthorized traffic outside the local network cannot come inside the network. An IP security gateway typically provides two types of services: external and internal. The external services might include reception of incoming email or providing directory services (DNS—Domain Naming System) for public services. The internal services are more extensive and only available for those inside the IP security gateway. These might include services for retrieving mail or finding confidential file servers. The network administrator is responsible for providing rules that define which network packets are allowed through the IP security gateway and under what conditions this occurs.

Encryptors 214, 216 and 218 are part of IP Security Gateways 208, 210 and 212, respectively, that connect the LANs to the Internet. If Charlott needs to access the server in Chicago, her packets go through encryptor 214 contained in IP Gateway 208 and then out to Internet 200. The packets are routed to IP Gateway 210 and encryptor 216. Encryptor 216 determines that Charlott does have proper access to LAN 204 and records the encryption technique being used for sending replies. The interception of the packet over the Internet by an adversary would cause little or no problem since the packet is encrypted at that time. Sensitive information that allows access to systems can be exchanged back and forth using encryption.

Figure 3:
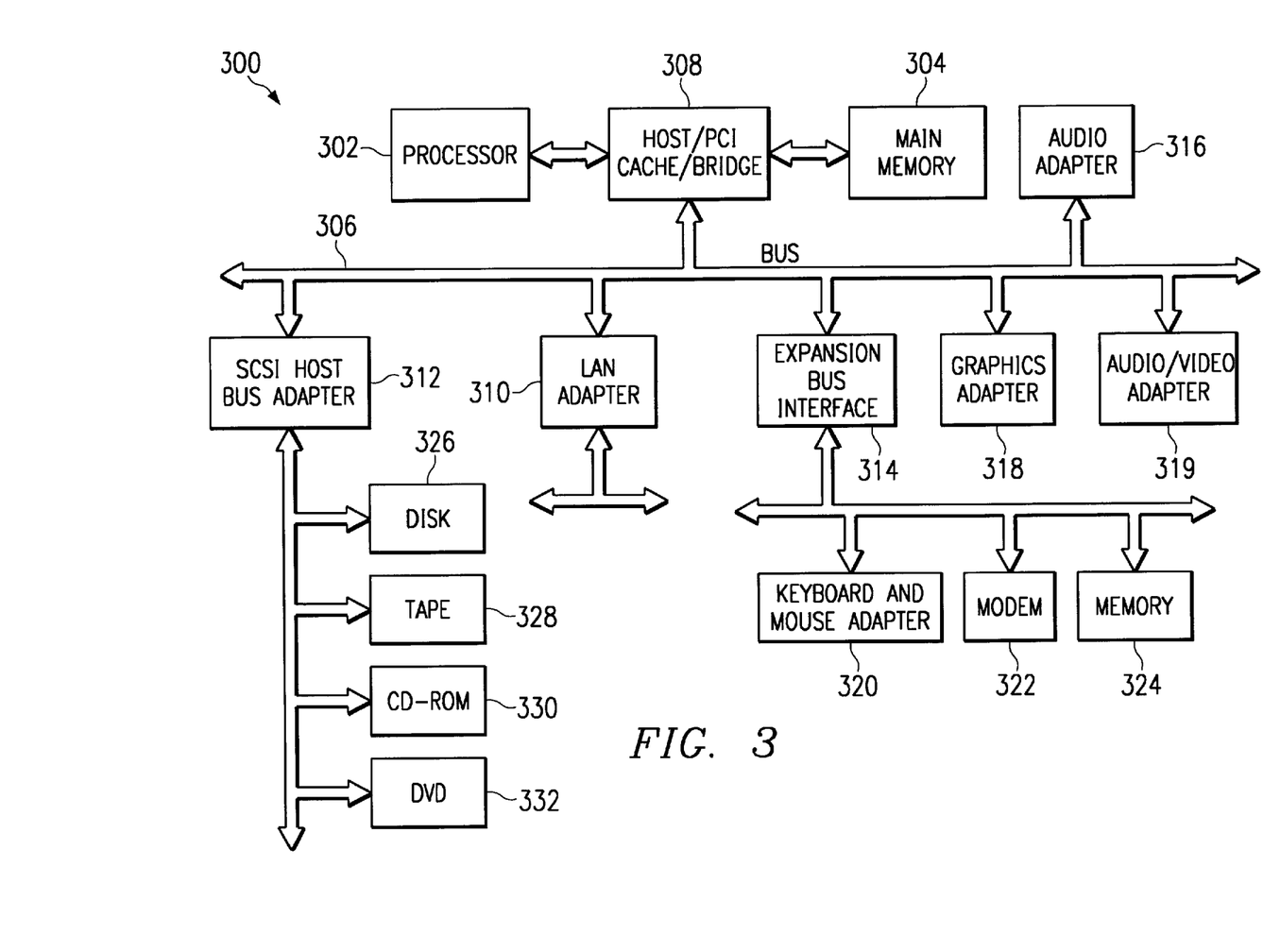
FIG. 3 is a block diagram of an individual data processing system in which the present invention may be implemented.

With reference now to FIG. 3, a block diagram of a data processing system in which the present invention may be implemented is illustrated. Data processing system 300 is an example of a networked computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. The LAN Adapter 310 is sometimes called a Network Interface Card (NIC), and it is possible to have multiple NICs on a single system. The audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as AIX (Advanced Interactive Executive), which is available from International Business Machines Corporation. "AIX" is a trademark of International Business Machines Corporation. System-level software, such as korn-shell scripts, may run in conjunction with the operating system, providing calls to the operating system on data processing system 300. Instructions for the operating system, the korn-shell scripts, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
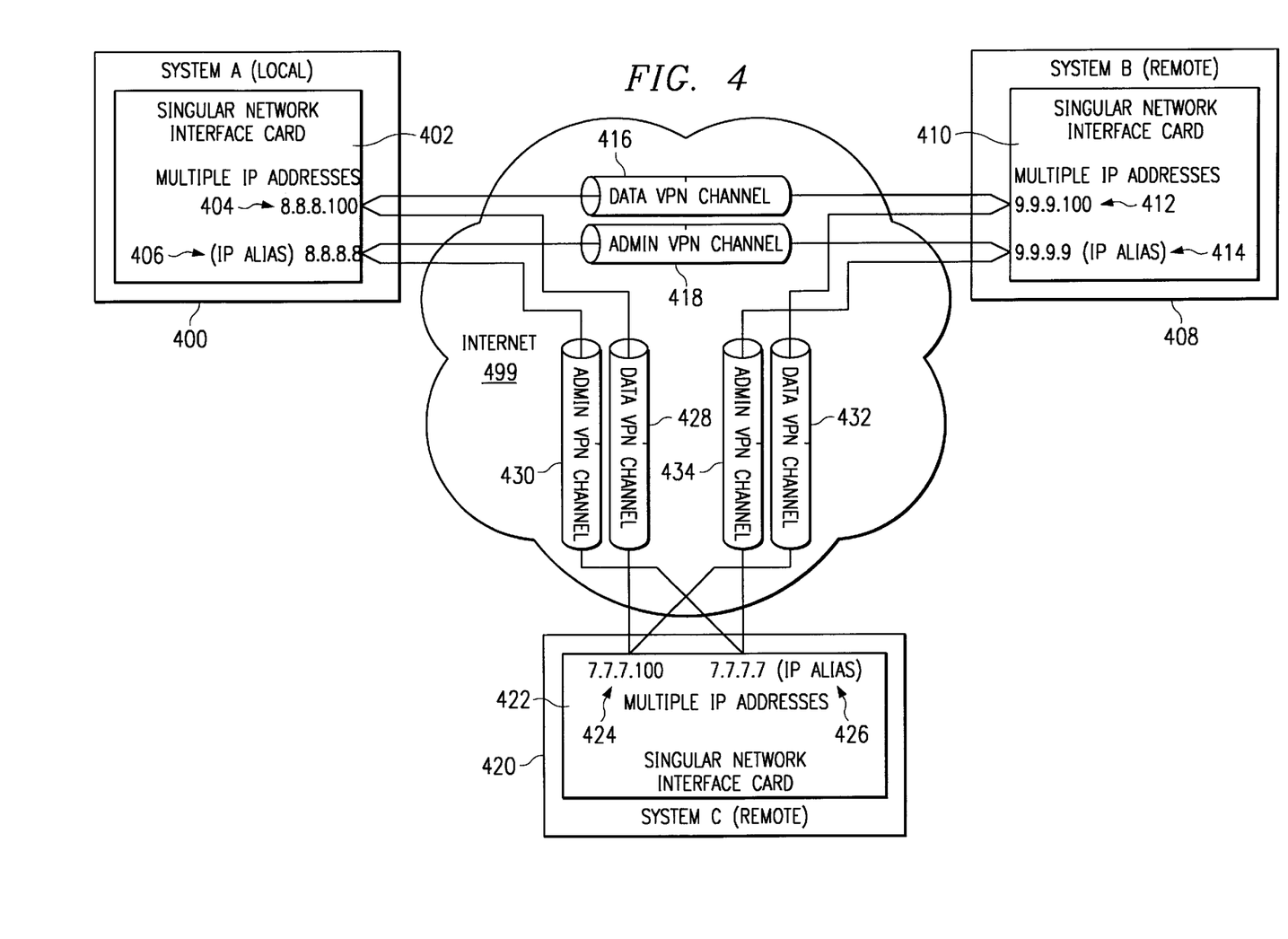
FIG. 4 illustrates a set of dual data and administration channels between three machines on a VPN.

With reference now to FIG. 4, a block diagram depicts a data processing network that implements VPN administration channels in accordance with the present invention. The local system, called System A 400, contains a single Network Interface Card (NIC) 402. This card is set up with two IP addresses: main address 404 set as 8.8.8.100 and IP alias 406 set as 8.8.8.8. System B 408 is a remote system with a single NIC 410. It also has two IP addresses: main address 412 set as 9.9.9.100 and IP alias 414 set as 9.9.9.9. There is a Virtual Private Network (VPN) using the Internet 499 as a carrier between System A 400 and System B 408. Data VPN Channel 416 has been established between main IP address 404 on System A and main IP address 412 on System B. A second VPN channel between System A and System B, Admin VPN Channel 418, has been established for administrative tasks between IP alias 406 on System A and IP alias 414 on System B. It is important to note that only a single NIC is needed on each machine to set up this secondary channel.

FIG. 4 also depicts how other machines can be added to the network. System C 420 at a remote location also contains a single NIC 422. It has main IP address 424 set as 7.7.7.100 and IP alias 426 set as 7.7.7.7. Data VPN Channel 428 is established between IP address 404 on System A and IP address 424 on System C. Administrative VPN Channel 430 is established between IP alias 406 on System A and IP alias 426 on System C. In a similar manner, a Data VPN Channel 432 and Administrative VPN Channel 434 are set up from System B and System C on IP addresses 412 and 424 and IP aliases 414 and 426, respectively. Hence, the Data VPN Channels in this network are comprised of channels 416, 428 and 432, and the Administration VPN channels are comprised of channels 418, 430 and 434.

Figure 5:
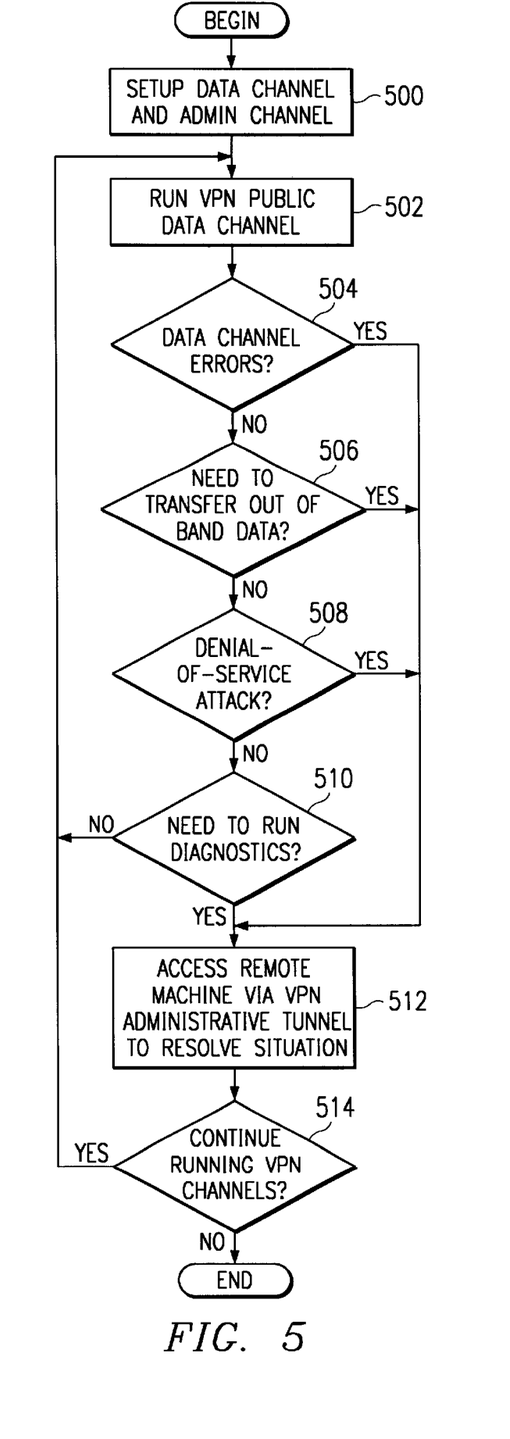
FIG. 5 is a flow diagram showing the setup and use of an administration channel.

With reference now to FIG. 5, a flowchart that shows the use of Administrative Channels and illustrates the utility of the present invention. The Data and Administrative Channels have to be set up (step 500), which is explained in more detail in FIG. 6. Normal use of the VPN uses the Data VPN Channels (step 502). However, several problems may arise that require attention of the network administrator. If there are data channel errors (step 504), then the network administrator would use the Administrative VPN Channel to access the problematic machine in order to correct the problem (step 512). Examples of data channel errors might be an incorrect refresh of secret keys on the data channel causing it to be disabled or an incorrect activation time where a data channel may shut down prematurely. If there is a need to transfer out-of-band data (step 506), this can be done using the Administrative VPN Channel (step 512). As an example of out-of-band data consider System A, System B, and System C in FIG. 4. Suppose data and administrative channels have been established between System A and System B and also between System A and System C. Further, suppose that data and administrative channels have not yet been established between System B and System C. Establishing such a channel requires knowledge of the number of channels, secret keys, encryption standard, etc. This out-of-band data could be safely sent from System A to System B and also from System A to System C. Then Systems B and C would have enough information to establish direct Data and Administrative VPN channels.

If there is a denial-of-service attack (step 508), then the network administrator would use the Administrative VPN Channel to correct the problem (step 512). As an example of a denial-of-service attack, a common trick among hackers is to flood a particular target on the Internet with a series of trivial activities or incomplete packets just to tie the site up trying to respond to these activities. This may make the site virtually inaccessible, thus making corrective actions difficult. However, by using a separate Administrative VPN channel, the problem can be handled directly and the attack warded off. If there is a need to run diagnostics (step 510), the Administrative VPN Channel can be used for this purpose (step 512). These are only a few examples of the representative situations that may require use of the Administrative VPN Channels. If after correcting a problem it is desired to continue running the VPN Channels (step 514), then control transfers to normal use of the Data VPN Channels (step 502). Otherwise, the network administrator can end the process.

Figure 6:
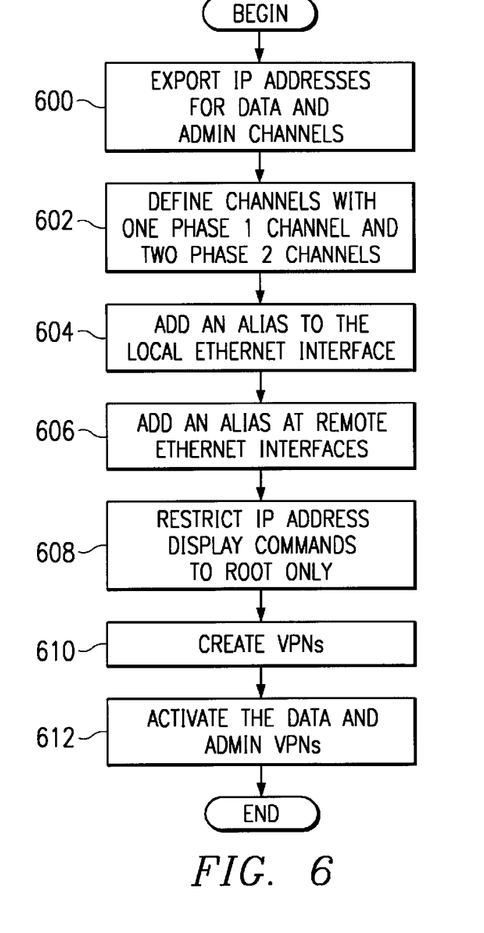
FIG. 6 depicts the detailed steps of the setup process in flow diagram form.

With reference now to FIG. 6, a flowchart shows the details of the process for setting up the Data and Administrative Channels, as implemented in the present invention. The data and administrative IP addresses need to be exported so that they will be visible elsewhere in the system (step 600). The initial definition (step 602) has two Phases referred to as Phase 1 and Phase 2. During Phase 1, a single channel is used between two sites to negotiate the initial setup, including number of channels, secret keys, encryption standard, etc. During Phase 2, the data and administrative channels are setup. Next, an alias IP address needs to be added to the local NIC (step 604). The IP aliases are then set up at each remote site on its NIC (step 606). Since the Administrative VPN Channels will be unpublished, restrictions are made so the IP addresses will only be displayed at the network administrator node (step 608). The VPNs are then created (step 610), and the Data and Administrative Channels are activated (step 612). In summary, step 602 defines all the protocols that will be used in the VPN, steps 604 and 606 set up the local and remote IP addresses, step 608 is an optional step to prevent display of the hidden IP addresses except on the root node, and then the VPNs are created (step 610) and activated (step 612).

Figure 7B:
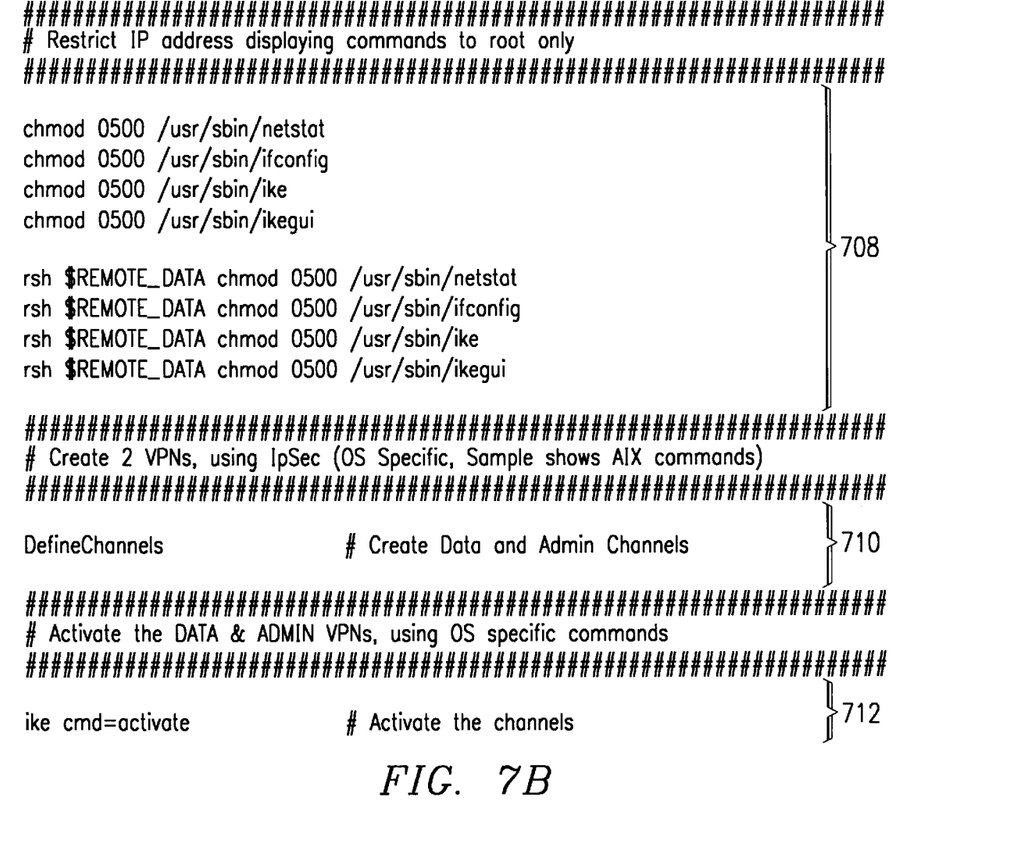

With reference now to FIG. 7A and FIG. 7B, a korn-shell script shows the details of setting up the Data and Administrative VPN Channels for one particular implementation of the present invention. The commented sections of this script match the flowchart activities described in FIG. 6. This script illustrates a simple VPN with only two machines, one local and one remote. The basic steps can be extended to set up more machines at remote sites. Some of the commands shown are specific to the AIX operating system but could be adapted to other operating systems.

The IP addresses, in this case two Data Channels addresses (one local and one remote) and two Administrative Channels addresses (one local and one remote), are exported so that they will be visible elsewhere in the system, as shown in statements 700. During Phase 1 of defining the Channels, the number of channels is specified, the secret keys are negotiated, the encryption standard is set, and so forth. During Phase 2 one Data Channel and one Administrative Channel are defined (in this particular script). The actual DefineChannels function is shown in statement 702. The ifconfig (interface configuration) command is used to add an alias for the local NIC, as shown in statement 704. The same command has to be run on the remote machines; this is accomplished using the remote shell (rsh) command, as shown in statement 706.

The UNIX command to change mode (chmod) is used to restrict the display of the IP addresses to the network administrator machine, as shown in statements 708. The mode 0500 means only the owner has read and execute privileges. The same commands are run at the remote site using the rsh command, also shown in statements 708. The restrictions shown here are to four particular subdirectories; the exact form of these commands is system dependent. This step is optional and is only included to illustrate implementing a "need to know" policy.

The VPNs are created by calling DefineChannels, as shown in statement 710. This command is operating system specific, and systems other than AIX would use an equivalent command. The final step is the activation of the Data VPN Channel and the Administrative VPN Channel, as shown in statement 712. The AIX command "ike" is shown; an equivalent command would be used with other operating systems.

Alternatively, Data and Administrative VPN Channels may be configured using methods other than the execution of a script. Various operating system commands may be entered through a command line interface, e.g., by a system or network administrator having the appropriate security or system privileges, to accomplish the configuring of the VPN. In addition, an application with a graphical user interface may be executed in which a network or system administrator enters the addresses for the VPN, and this application may dynamically configure the VPN or store the VPN information for a subsequent static configuring operation.

The advantages of the present invention should be clear from the detailed description provided above. If a machine on a VPN becomes inaccessible for any reason (such as a mis-configured security code or a denial of a service attack), it is still possible for the network administrator to remotely access the machine and correct the problem. Since a single NIC is used, no additional new hardware is required. This invention provides fault tolerance to existing systems and protects a VPN system from a single point of failure. The network administrator can control the degree of fault tolerance. For example, if more fault tolerance is desired, additional Administrative VPN Channels can be added with no additional hardware costs. By keeping the IP addresses hidden, this invention provides greater network security. The network administrator can monitor and run diagnostic programs as necessary in order the optimize the primary Data VPN Channels or take corrective actions when required.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method for communicating on a network between a first data processing system having a single network interface card (NIC) and a second data processing system having a single NIC, the method comprising the computer-implemented steps of:

transmitting data packets on the network from the first data processing system to the second data processing system on a first channel in a virtual private network (VPN) using a primary network address; and transmitting administrative packets, which are related to the operation of the first channel, on the network from the first data processing system to the second data processing system on a second channel in the VPN using an alias network address, the second channel being capable of transmitting the administrative packets concurrently with the first channel transmitting the data packets, wherein each data processing system transmits data packets and administrative packets using its single NIC which supports multiple network addresses simultaneously.

2. The method of claim 1 wherein the data and administrative packets are transmitted using Internet Protocol (IP).

3. The method of claim 1 wherein the step of transmitting data packets on the network further comprises:

transmitting data packets through a first VPN channel between the first data processing system and the second data processing system, wherein a first end of the first VPN channel is terminated by the first data processing system using a first network address and a second end of the first VPN channel is terminated by the second data processing system using a second network address;

transmitting administrative packets through a second VPN channel between the first data processing system and the second data processing system, wherein a first end of the second VPN channel is terminated by the first data processing system using a third network address and a second end of the second VPN channel is terminated by the second data processing system using a fourth network address.

4. The method of claim 3 wherein the first network address and the second network address are primary IP addresses, and wherein the second network address and the third network address are alias IP addresses.

5. The method of claim 1 wherein the network comprises the Internet.

6. The method of claim 1 wherein the administrative VPN channel is used to perform one of the following actions: correct data channel errors, run diagnostics, or perform other administrative tasks independent of whether the data channel has become inoperative.

7. A method for communicating on a network, the method comprising the computer-implemented steps of:

configuring a data virtual private network (VPN) channel using a primary IP address; and configuring an administrative VPN channel using an alias IP address, wherein the data VPN channel and the administrative VPN channel share a single network interface card.

8. The method of claim 7 further comprising:

transmitting data packets on the network using the data VPN channel; and transmitting administrative packets on the network using the administrative VPN channel.

9. The method of claim 7 wherein the network comprises the Internet.

10. The method of claim 7 wherein the primary IP address and one or more alias IP addresses are configured through an execution of a script.

11. The method of claim 7 wherein the primary IP address and one or more alias IP addresses are selectable through a graphical user interface.

12. The method of claim 7 wherein the data VPN channel and the administrative VPN channel operate independently.

13. The method of claim 7 wherein the administrative VPN channel is used to perform one of the following actions: correct data channel errors, run diagnostics, or perform other administrative tasks independent of whether the data channel has become inoperative.

14. A data processing system for communicating on a network, the data processing system comprising:

first configuring means for configuring a data virtual private network (VPN) channel using a primary IP address; and second configuring means for configuring an administrative VPN channel using an alias IP address, wherein the data VPN channel and the administrative VPN channel share a single network interface card.

15. The data processing system of claim 14 further comprising:

first transmitting means for transmitting data packets on the network using the data VPN channel; and second transmitting means for transmitting administrative packets on the network using the administrative VPN channel.

16. The data processing system of claim 14 wherein the network comprises the Internet.

17. The data processing system of claim 14 wherein the primary IP address and one or more alias IP addresses are configurable through the execution of a script.

18. The data processing system of claim 14 wherein the primary IP address and one or more alias IP addresses are selectable through a graphical user interface.

19. The data processing system of claim 14 wherein the data VPN channel and the administrative VPN channel on the virtual private network operate independently.

20. The data processing system of claim 14 wherein the administrative VPN channel is used to perform one of the following actions: correct data channel errors, run diagnostics, or perform other administrative tasks independent of whether the data channel has become inoperative.

21. A computer program product on a computer-readable medium for use in a data processing system for communicating on a network, the computer program product comprising:

instructions for configuring a data virtual private network (VPN) channel using a primary IP address; and instructions for configuring an administrative VPN channel using an alias IP address, wherein the data VPN channel and the administrative VPN channel share a single network interface card.

22. The computer program product of claim 21 further comprising:

instructions for transmitting data packets on the network using the data VPN channel; and instructions for transmitting administrative packets on the network using the administrative VPN channel.

23. The computer program product of claim 21 wherein the network comprises the Internet.

* * * * *